United States Patent [19]

Daniels et al.

[11] Patent Number: 5,650,695
[45] Date of Patent: Jul. 22, 1997

[54] ILLUMINATION UNIT; AND ELECTRODELESS LOW-PRESSURE DISCHARGE LAMP, HOLDER, AND SUPPLY UNIT SUITABLE FOR USE IN THE ILLUMINATION UNIT

[75] Inventors: Johnny A. J. Daniels; Willy L. G. Eijkens, both of Turnhout, Belgium

[73] Assignee: U.S. Philips Corporation, New York, N.Y.

[21] Appl. No.: 587,599

[22] Filed: Jan. 2, 1996

Related U.S. Application Data

[63] Continuation of Ser. No. 358,430, Dec. 19, 1994, abandoned.

[30] Foreign Application Priority Data

Dec. 17, 1993 [BE] Belgium ............... 09301409

[51] Int. Cl.$^6$ ............... H05B 41/16
[52] U.S. Cl. ............... 315/248; 315/39; 315/344; 315/267
[58] Field of Search ............... 315/248, 39, 111.51, 315/267, 344

[56] References Cited

U.S. PATENT DOCUMENTS

| | | | |
|---|---|---|---|
| 5,059,868 | 10/1991 | Hamamsy et al. | 315/248 |
| 5,142,201 | 8/1992 | Wessels | 315/248 |
| 5,175,476 | 12/1992 | Anderson et al. | 315/248 |

FOREIGN PATENT DOCUMENTS 0332263  9/1989  European Pat. Off. .

*Primary Examiner*—Frank G. Font
*Assistant Examiner*—Reginald A. Ratliff
*Attorney, Agent, or Firm*—Walter M. Egbert, III

[57] ABSTRACT

An illumination unit according to the invention comprises an electrodeless low-pressure discharge lamp 10. The illumination unit is provided with a lamp vessel 20 which encloses a discharge space 21 which contains an ionizable filling. The illumination unit is in addition provided with a holder 60 for the lamp vessel 20, with a coil 30 for generating a high-frequency magnetic field so as to maintain an electric discharge in the discharge space 21, and with a high-frequency supply 50 for the coil. The illumination unit is further provided with ignition aids 40 for promoting the initiation of the discharge. The coil 30 has a primary 31 and a secondary winding 32, the primary winding 31 having a first 34A and a second end 34B which are connected to a first 51 and a second contact 52, respectively, of the supply 50, such that the first contact 51 supplies a high-frequency voltage and the second contact 52 a reference voltage free from high-frequency variations in a nominal operational state of the illumination unit, in which state a voltage gradient arises in the primary winding 31 in a direction from the first 34A to the second end 34B, whereby a voltage gradient is generated in the secondary winding 32 in a direction from a first 35A to a second end 35B which is opposed to that from the first 34A to the second end 34B in the primary winding 31, while high-frequency variations of the voltage averaged over the joint surface area of the primary 31 and the secondary winding 32 are comparatively small against high-frequency variations of the voltage averaged over the surface of the primary winding 31. The ignition aids 40 achieve that, after switching-on of the illumination unit, the nominal operational state is preceded by an ignition state in which the second end 35B of the secondary winding 32 is disconnected from the second contact 52 of the supply 50. The measure counteracts attacks on the wall of the discharge vessel 20.

11 Claims, 2 Drawing Sheets

5,650,695

ILLUMINATION UNIT; AND ELECTRODELESS LOW-PRESSURE DISCHARGE LAMP, HOLDER, AND SUPPLY UNIT SUITABLE FOR USE IN THE ILLUMINATION UNIT

This is a continuation of application Ser. No. 08/358,430 Filed Dec. 19, 1994, now abandoned.

BACKGROUND OF THE INVENTION

The invention relates to an illumination unit comprising an electrodeless low-pressure discharge lamp, which illumination unit is provided with a lamp vessel enclosing a discharge space which contains an ionizable filling, a holder for the lamp vessel, a coil for generating a high-frequency magnetic field for maintaining an electric discharge in the discharge space, a high-frequency supply for the coil, and ignition aids for promoting an initiation of the discharge, which coil is provided with a primary and a secondary winding, the primary winding having a first and a second end which are connected to a first and a second contact, respectively, of the supply, while in a nominal operational state of the illumination unit the first contact supplies a high-frequency voltage and the second contact supplies a reference voltage free from high-frequency variations, in which state a voltage gradient arises in the primary winding in a direction from the first to the second end, and in the secondary winding a voltage gradient is generated in a direction from a first to a second end which is opposed to that from the first to the second end in the primary winding, while high-frequency variations of the voltage averaged over the joint surface area of the primary and the secondary winding are comparatively small in relation to high-frequency variations of the voltage averaged over the surface area of the primary winding.

The invention also relates to an electrodeless low-pressure discharge lamp suitable for use in the illumination unit, and also to a holder and to a supply unit suitable for use in such an illumination unit.

Such an illumination unit is known from EP 0.332.263 A1. In the known illumination unit, the supply is accommodated in a housing fastened to the lamp vessel. A first contact of the supply delivers a voltage which varies with high frequency, i.e. with a frequency above 20 kHz. In fact, the frequency is approximately 3 MHz. The supply has a second contact which supplies a reference voltage free from high-frequency variations. The reference voltage is, for example, equal to earth potential, but may alternatively be any other voltage free from high-frequency variations. This asymmetrical supply may be comparatively simple in comparison with a symmetrical supply, i.e. a supply in which the voltages at the contacts are in mutually opposed faces.

The lamp vessel has a luminescent layer at its inside and is provided with a filling containing mercury. The coil has a primary winding of 13 turns and a secondary winding of 14.5 turns. The turns in this known illumination unit all have the same winding direction and extend over a length of 30 mm around a core of soft-magnetic material with a length of 50 mm. The secondary winding has a first free end. An opposed, second end is connected to the second contact of the supply. During operation, a voltage is generated in the secondary winding which has a gradient from the reference voltage at the second end to a voltage at the first end which has approximately the same value, but with opposite sign, as that of the first contact. High-frequency variations in the voltage averaged over the coil surface therefore have an amplitude which is comparatively small compared with high-frequency variations of the voltage averaged over the surface area of the primary winding. The interference caused by the illumination unit is accordingly comparatively small compared with that in the case of an illumination unit with a primary winding only.

With the primary and the secondary winding having the same winding direction, the voltage gradients in these windings have the same direction. A voltage gradient accordingly occurs in the secondary winding which is opposed to that from the first to the second end of the primary winding in a direction opposed to that from the first to the second end of the primary winding. The direction from the first to the second end of the primary winding accordingly is opposed to that from the first to the second end of the primary winding.

If the winding direction of the secondary winding is chosen to be opposed to that of the primary winding, the voltage gradients in these windings are of opposite directions. In that case the direction from the first to the second end of the secondary winding is equal to that from the first to the second end of the primary winding.

The voltage gradient in the primary winding and that in the secondary winding jointly result in an electric field in the discharge space. This field is capable of igniting the lamp at a sufficiently high amplitude of the voltage delivered by the supply. The known illumination unit has an electrical conductor at the first end of each of the windings. The conductors carry a voltage which differs comparatively strongly from the reference voltage. Unlike the windings, the conductors are at a comparatively great distance from one another. These ignition aids accordingly prevent the electric field lines from concentrating around the windings. An electric field is thus generated in the discharge space which is strong enough for igniting the lamp already at a comparatively low voltage across the primary winding.

This measure, however, has the disadvantage that charged particles in the discharge space, such as mercury ions, react with the wall material during operation owing to the comparatively strong electric field. The wall suffers a comparatively strong blackening thereby and mercury becomes unavailable for the discharge. The useful life of the illumination unit is adversely affected by this effect.

The invention has for its object to provide a measure in an illumination unit of the kind mentioned in the opening paragraph which also results in a comparatively low ignition voltage of the lamp, but which renders it possible to avoid the above disadvantage.

According to the invention, the illumination unit is for this purpose characterized in that, after switching-on, the ignition aids achieve that the nominal operational state is preceded by an ignition state in which the second end of the secondary winding is disconnected from the second contact of the supply unit.

It is surprising that the secondary winding need not hamper lamp ignition in spite of the fact that in the ignition state a voltage gradient is generated in the secondary winding whose value corresponds to that obtaining during the nominal operational state. Since the second end of the secondary winding is disconnected from the second contact of the supply in the ignition state, the interval over which the voltage has its gradient differs from that during the nominal operational state. Contributions to the electric field resulting from high-frequency voltage differences between the windings and earth do not cancel one another out in the ignition state. The inventors have found that a considerably lower ignition voltage can suffice under these circumstances compared with the case in which the second end of the secondary winding is connected to the second contact of the supply. Since the ignition state lasts much shorter than the nominal operational state, the measure renders it possible to avoid the disadvantage mentioned above.

In an illumination unit according to the invention, the secondary winding may be permanently connected with one end to the second contact of the supply. The illumination unit is then brought into the ignition state in that a bipolar switch interchanges the connections of the ends of the primary winding to the supply contacts. This switching of the connections reverses the voltage gradient in the primary, and thus also in the secondary winding. The voltage interval traversed in the primary winding remains the same. In the secondary winding, however, the voltage interval traversed during the ignition state differs from that during the nominal operational state. The voltage is equal to the reference voltage at the permanently connected end. Since the voltage gradient is reversed, the voltage changes towards the other end to a value opposed to that which it would have during the nominal operational state. Electric fields caused by voltage variations in the secondary winding thus reinforce those which are derived from the primary winding, so that the lamp will ignite readily. The switching of the connections causes the ends to interchange their functions. In the ignition state, accordingly, the second end is an end which is disconnected from the second contact of the supply.

An attractive embodiment of the illumination unit according to the invention is characterized in that the ignition aids between the second end of the secondary winding and the second contact of the supply comprise a first switch which is open in the ignition state and closed in the nominal operational state. The switch is, for example, a semiconductor switch. A comparatively great reduction in the ignition voltage can thus be realised by comparatively limited means.

A favourable modification of the above embodiment is characterized in that the secondary winding is decoupled in the ignition state. A single switch can suffice in this way. The average voltage of the secondary winding cannot change because no charge can flow to or from the secondary winding in the decoupled state. High-frequency variations in the average voltage of the primary winding are not compensated by those in the secondary winding as a result.

In a further favourable modification of the above embodiment of the invention, the ignition aids in addition comprise a second switch, which is closed in the ignition state and open in the nominal operational state, between the first contact of the supply and the first end of the secondary winding. In this modification, it is realised by simple means that the secondary winding and the primary winding together generate an electric field in the ignition state which is more effective than would have been possible with the primary winding alone, given the voltage at the first supply contact.

The ignition state may have a predetermined duration, for example, because a timer switch is used which causes the illumination unit to enter the nominal operational state, for example, 100 ms after switching-on.

Preferably, the transition from the ignition state to the nominal operational state is dependent on a lamp parameter. It is achieved in a simple manner thereby that the ignition state does not end before the lamp has ignited. The beginning of the nominal operational state depends, for example, on the power consumed by the lamp.

An attractive embodiment of the illumination unit according to the invention is characterized in that said lamp parameter is a temperature. This may be, for example, the temperature in a location at the surface of the lamp vessel. The transition from the ignition state to the nominal operational state is realised, for example, by means of one or several bimetal switches arranged in the vicinity of the lamp vessel. Such switches may be comparatively inexpensive.

A very attractive embodiment is characterized in that said lamp parameter is light generated by the lamp. The nominal operational state can then commence immediately after the lamp has ignited.

In an embodiment of the illumination unit according to the invention, the supply unit is accommodated in a holder fastened to the lamp vessel.

Alternatively, the supply unit may be accommodated in a separate housing, the electrodeless lamp being connected to the supply unit by means of a cable. The invention accordingly also applies to an electrodeless low-pressure discharge lamp suitable for use in an illumination unit as described with reference to one of the above embodiments of the invention, which lamp is provided with the lamp vessel, the holder, the coil, and the ignition aids.

The lamp vessel may be detachably coupled to the holder. If so desired, it may then be replaced by a new lamp vessel, for example, one provided with a luminescent layer which luminesces at a different colour temperature. A holder according to the invention suitable for use in an illumination unit as described above is provided with the coil and with the ignition aids, while the lamp vessel can be coupled to the holder.

The ignition aids for the lamp may form a supply device in conjunction with the supply unit. A supply device according to the invention suitable for use in an illumination unit as described above with reference to one of the embodiments is provided with the high-frequency supply and with the ignition aids.

An embodiment of the supply device according to the invention is characterized in that the supply device is in addition provided with the coil.

BRIEF DESCRIPTION OF THE DRAWINGS

Embodiments of the illumination unit according to the invention will be explained in more detail with reference to the drawings, in which.

DESCRIPTION OF THE PREFERRED EMBODIMENTS

Figure 1:
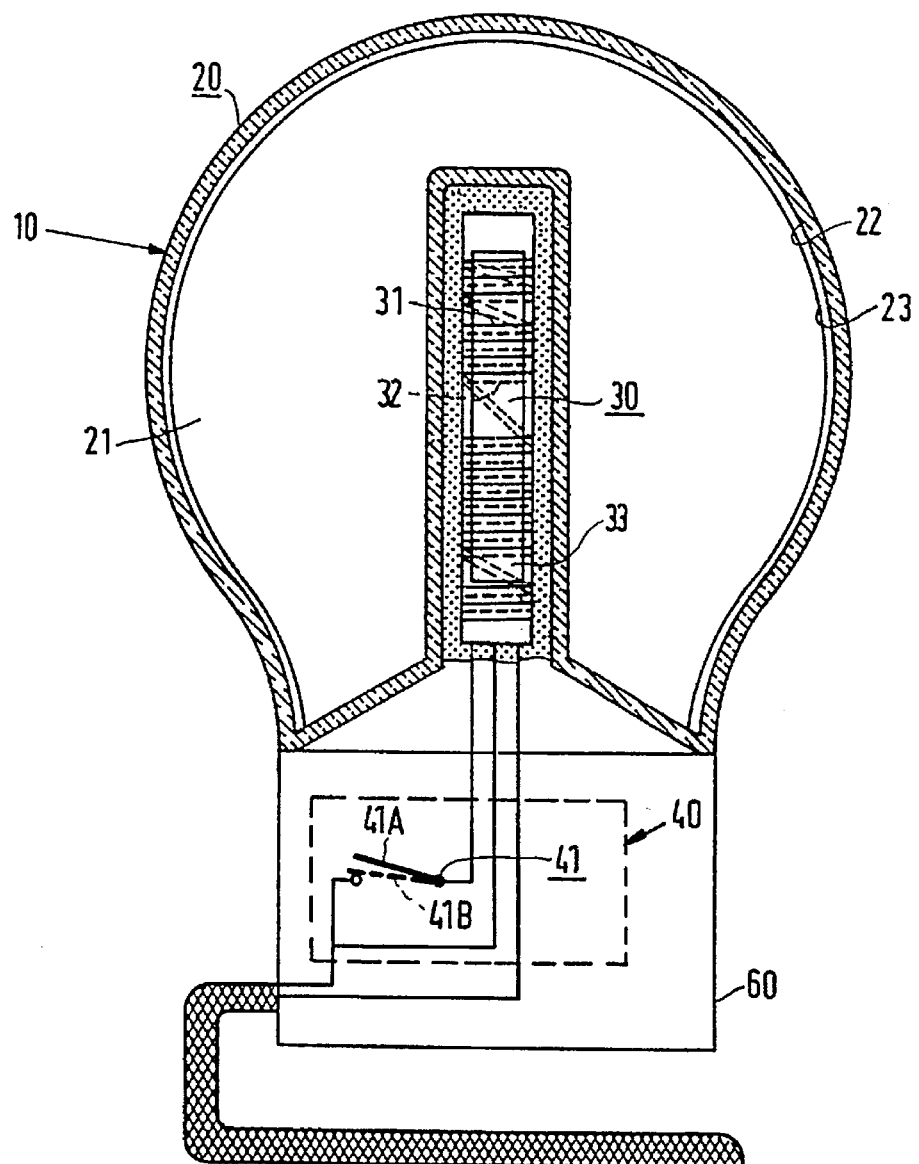
FIG. 1 shows an embodiment of the illumination unit with the electrodeless lamp in longitudinal section, the supply being indicated diagrammatically.

The illumination unit shown in FIG. 1 comprises an electrodeless low-pressure discharge lamp 10.

The illumination unit is provided with a lamp vessel 20 which encloses a discharge space 21 and contains an ionizable filling. The lamp vessel 20 has at an inner surface 22 a luminescent layer 23 which comprises green-luminescing terbium-activated cerium-magnesium aluminate and red-luminescing yttrium oxide activated by trivalent europium.

The illumination unit is further provided with a holder 60 for the lamp vessel, with a coil 30 for generating a high-frequency magnetic field so as to maintain an electric discharge in the discharge space 21, and with a high-frequency supply 50 for the coil 30. The lamp vessel 20 may be detachably coupled to the holder 60.

The illumination unit is also provided with ignition aids 40 for promoting the initiation of the discharge.

Figure 2:
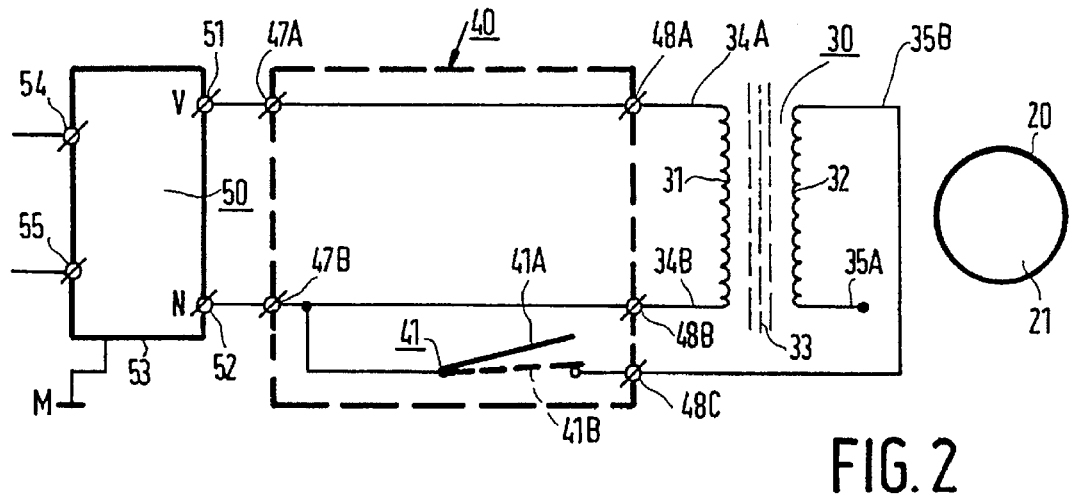
FIG. 2 is the circuit diagram of the illumination unit of FIG. 1, and FIGS. 3 and 4 show the circuit diagrams of further embodiments of the illumination unit according to the invention.

The coil 30 has a primary 31 and a secondary winding 32 around a core 33 of soft-magnetic material, here of Philips 4C6 ferrite (diagrammatically indicated in FIG. 2). Alternatively, a core may be absent. In the embodiment shown, the primary and the secondary winding have the same winding direction. The primary winding 31 has a first and a second end 34A, 34B which are connected to a first and a second contact 51, 52, respectively, of the supply 50. The first contact 51 of the supply 50 delivers a high-frequency voltage (V) relative to earth M. The second contact 52 supplies a reference voltage (N) which is free from high-frequency variations. For the sake of clarity, the examples mentioned in the present description are based on the assumption that the reference voltage (N) is equal to 0. The supply 50 accommodated in an earthed housing 53 furthermore has a first and a second input terminal 54, 55, for example for connection to the mains. In that case a voltage gradient over the interval (V, 0) arises in a direction from the first 34A to the second end 34B in the primary winding 31. In the secondary winding 32, a voltage gradient over the interval (−V, 0) is generated in a direction from a first 35A to a second end 35B which is opposed to the voltage gradient from the first to the second end 34A, 34B in the primary winding 31. It is assumed here for the sake of clarity that the absolute value of the voltage gradient in the secondary winding 32 is the same as that in the primary winding 31. The secondary winding 32, however, already provides a considerable reduction in interference if the absolute value of the voltage gradient therein is of the same order of magnitude as that in the primary winding 31.

In the nominal operational state, the second end 35B of the secondary winding 32 is connected to the second contact 52 of the supply 50 via the first switch 41 which is then in a closed state (shown with a broken line as 41B), switch 41 being a bimetal switch here. The second end 35B accordingly has a voltage 0. The first end 35A has a voltage −V. In the nominal operational state, the voltage in the secondary winding 32 shows a gradient from the reference potential to a value which is approximately as great as, but of opposite sign to, that of the first end 34A of the primary winding 31. High-frequency variations of the voltage averaged over the joint surface area of the primary and of the secondary winding 31, 32 are then at least substantially absent. Contributions to the electric field as a result of high-frequency voltage differences between the windings 31, 32 and earth M substantially compensate one another in the nominal operational state.

The ignition aids 40 achieve that, after switching-on of the illumination unit, the nominal operational state is preceded by an ignition state in which the second end 35B of the secondary winding 32 is disconnected from the second contact 52 of the supply 50. This is realised in the present case in that the first switch 41 is then in an open state 41A.

In the embodiment shown, the secondary winding 32 is decoupled in the ignition state.

The moment of transition from the ignition state to the nominal operational state is dependent on a lamp parameter, here a temperature of the lamp. At a sufficiently high temperature, the first switch 41 enters the closed state 41B, as a result of which the illumination unit passes from the ignition state into the nominal operational state.

Since the first switch 41 is open in the ignition state, no charge transport is possible anymore from or to the secondary winding 32 in this state. The average voltage of the secondary winding 32 cannot change then, so that it cannot compensate any high-frequency variations in the primary winding 31.

The electrodeless low-pressure discharge lamp 10 and the supply 50 are detachable from one another in the embodiment shown. The ignition aids 40 are accommodated in the lamp 10, i.e. in the holder 60 here. The lamp 10 of this embodiment is provided with contact elements 47A and 47B which are to be connected to respective contacts 51 and 52 of the supply 50.

Alternatively, the supply 50 together with the ignition aids 40 may form a supply device which is provided with output terminals 48A and 48B to which ends 34A and 34B of the primary winding 31 are to be connected, and with an output terminal 48C for connection to the end 35B of the secondary winding 32.

An embodiment of the supply device, furthermore, comprises the coil 30.

Figure 3:
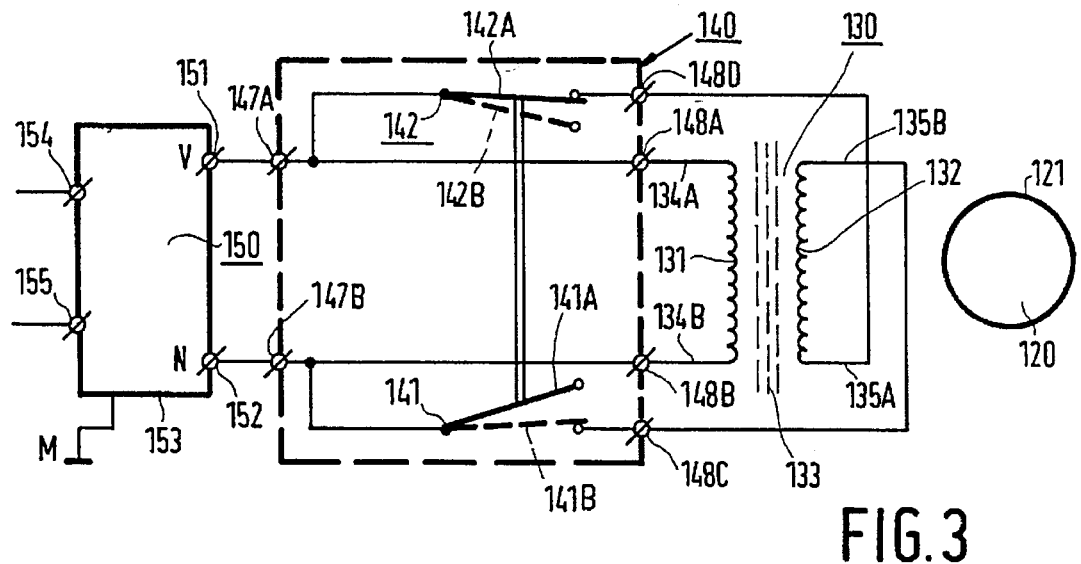

In FIG. 3, components corresponding to those of FIG. 2 have reference numerals which are 100 higher. This Figure shows the circuit diagram of a further embodiment of the illumination unit according to the invention. In this embodiment, the illumination unit has in addition to the first switch 141 a second switch 142 which is arranged between the first contact 151 of the supply 150 and the first end 135A of the secondary winding 132 and which is closed (position 142A) in the ignition state and open (position 142B, in broken line) in the nominal operational state.

In the ignition state, a voltage gradient over the interval (V, 0) occurs in a direction from the first to the second end 134A, 134B of the primary winding 31. Between the first and the second end 135, 135B of the secondary winding 132 the voltage curve covers the interval (V, 2V). The voltage value averaged over the joint surface area of the windings 131, 132 is V. The contributions to the electric field caused by high-frequency variations in the voltage difference between each of the windings 131, 132 and earth M reinforce one another.

In what position the first and the second switches 141, 142 are depends on a lamp parameter, in this case the light radiated by the lamp. The illumination unit comprises an optical sensor (not shown) which causes the switches 141, 142 to pass into the positions 141B and 142B corresponding to the nominal operational state when the light radiated by the lamp exceeds a threshold value.

A supply device comprising a supply 150 and ignition aids 140 has, besides the output terminals 148A–C mentioned above, also an output terminal 148D for end 135A of the secondary winding 132.

Figure 4:
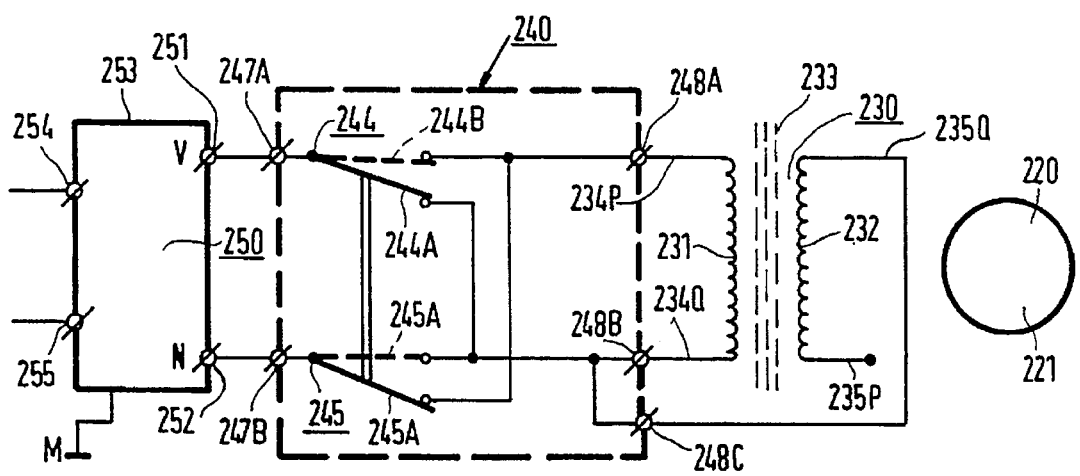

In FIG. 4, components corresponding to those of FIG. 2 have reference numerals which are 200 higher. An end 235Q of the secondary winding 232 is connected to an end 234Q of the primary winding 231 facing towards an opposed coil end. The windings 231, 232 of the coil are connected to the supply 250 via switching elements 244 and 245. In the ignition state, the switching elements 244, 245 occupy positions 244A and 245A, respectively. In this state, accordingly, ends 234Q and 234P form the first and the second end, respectively, of the primary winding 231. Since the windings 231, 232 have the same winding direction, an opposed voltage gradient is generated in the direction from end 235Q to 235P in the secondary winding 232. Ends 235Q, 235P thus form the first and the second end, respectively, in the ignition state.

In this state, the voltage in the primary winding 231 covers the interval (V, 0). The first end 235Q of the secondary winding 232 has a voltage V. A potential of 2V is generated in the second end 235P of the secondary winding 232, which in this state is the end which is detached from the second contact 252 of the supply 250. The contribution to the electric field caused by high-frequency variations in the voltage difference between the primary winding 231 and earth M is reinforced by a contribution caused by high-frequency variations in the voltage difference between the secondary winding 232 and earth M.

The switches 244, 245 occupy the positions indicated with broken lines in the nominal operational state. In this state, the ends 234P and 234Q form the first and the second end, respectively, of the primary winding 231. Between these ends 234P, 234Q, the voltage covers the interval (V, 0). The first and the second end of the secondary winding 232 are formed by end 235P and end 235Q, respectively, in this state. The second end in this state is the end 235Q which is connected to the second contact 252 of the supply 250. Between these ends, the voltage gradient is from 0 to –V. In this state, contributions to the electric field caused by high-frequency voltage differences between the windings 231, 232 and earth M cancel one another out.

In a modification, for example a modification of one of the above embodiments, the windings have mutually opposed winding directions. In this modification, the voltage gradient in the secondary winding relative to the coil axis is opposed to that in the primary winding. The direction from the first to the second end in the secondary winding in this modification corresponds to the direction from the first to the second end in the primary winding. In a cylindrical coil, the first ends of the windings will be facing the same end of the coil.

Three illumination units were manufactured in order to investigate the ignition characteristics of the lamp of the illumination unit according to the invention. The three illumination units each comprise a supply which delivers an AC voltage with a frequency of 2.65 MHz. The windings of the coil (referred to as coil I hereinafter) comprise five segments of 1, 2, 4, 9, and 3 turns in that order, with lengths of 2, 3, 7, 15, and 5 mm. The last segment lies just beyond the end of the core. Said segments have interspacings of 3, 6, 10, and 3 mm, respectively. The lamp vessel contains a filling of 3 mg Hg, Ar with a filling pressure of 33 Pa and $^{85}$Kr at a partial pressure of 50 Torr. In the first illumination unit, the windings of the coil are connected as in the known illumination unit. In the second illumination unit, the windings are connected as in the ignition state of the embodiment (I) of the invention described with reference to FIGS. 1 and 2. In the third illumination unit, the coil is connected in accordance with the ignition state of the embodiment (II) of FIG. 3. The ignition voltage was also measured in the three illumination units mentioned with no mercury in the lamp vessel. The ignition voltage was determined in that the amplitude of the voltage applied to the first contact of the supply was increased until the lamp ignited. The measurements were repeated for a coil whose windings comprise 17 turns each, evenly spread over the core. This coil has been indicated with coil II hereinafter.

The results are shown in the following Table.

| Ignition voltage | Known illumination unit | Embodiment I of invention | Embodiment II of invention |
| --- | --- | --- | --- |
| | With mercury filling | | |
| Coil I | 360 | 240 (–33%) | 132 (–63%) |
| Coil II | 340 | 228 (–33%) | 124 (–64%) |
| | Filling without mercury | | |
| Coil I | 756 | 480 (–37%) | 300 (–60%) |
| Coil II | 660 | 500 (–24%) | 272 (–59%) |

It is evident from the Table that, with the use of the same coil type and the same filling, a lamp according to the first embodiment of the invention already has a considerably lower ignition voltage than a lamp without ignition aids. A lamp according to the second embodiment of the invention has an ignition voltage which is even approximately 60% lower than that of a lamp without ignition aids. The measure according to the invention accordingly leads to a reduction in the ignition voltage which is of the same order of magnitude as that of the known lamp, while nevertheless adverse effects of this measure can be easily avoided because the illumination unit need dwell in the ignition state for a comparatively short period only.

We claim:

1. An illumination unit comprising an electrodeless low-pressure discharge lamp, which illumination unit is provided with a lamp vessel enclosing a discharge space which contains an ionizable filling, a holder for the lamp vessel, a coil for generating a high-frequency magnetic field for maintaining an electric discharge in the discharge space, a high-frequency supply for the coil, and ignition aids for promoting an initiation of the discharge, which coil is provided with a primary and a secondary winding, the primary winding having a first and a second end which are connected to a first and a second contact, respectively, of the supply, while in a nominal operational state of the illumination unit the first contact supplies a high-frequency voltage and the second contact supplies a reference voltage free from high-frequency variations, in which state a voltage gradient arises in the primary winding in a direction from the first to the second end, and in the secondary winding a voltage gradient is generated in a direction from a first to a second end which is opposed to that from the first to the second end in the primary winding, while high-frequency variations of the voltage averaged over the joint surface area of the primary and the secondary winding are comparatively small in relation to high-frequency variations of the voltage averaged over the surface area of the primary winding, characterized in that, after switching-on, the ignition aids achieve that the nominal operational state is preceded by an ignition state in which the second end of the secondary winding is disconnected from the second contact of the supply unit.

2. An illumination unit as claimed in claim 1, characterized in that the ignition aids between the second end of the secondary winding and the second contact of the supply comprise a first switch which is open in the ignition state and closed in the nominal operational state.

3. An illumination unit as claimed in claim 2, characterized in that the secondary winding is decoupled in the ignition state.

4. An illumination unit as claimed in claim 2, characterized in that the ignition aids in addition comprise a second switch, which is closed in the ignition state and open in the nominal operational state, between the first contact of the supply and the first end of the secondary winding.

5. An illumination unit as claimed in claim 4, characterized in that the transition from the ignition state to the nominal operational state is dependent on a lamp parameter.

6. An illumination unit as claimed in claim 5, characterized in that said lamp parameter is a temperature.

7. An illumination unit as claimed in claim 5, characterized in that said lamp parameter is light generated by the lamp.

8. An electrodeless low-pressure discharge lamp suitable for use in an illumination unit as claimed in claim 7, which lamp is provided with the lamp vessel, the holder, the coil, and the ignition aids.

9. A holder suitable for use in an illumination unit as claimed in claim 1, which holder is provided with the coil and with the ignition aids, and to which holder the lamp vessel can be coupled.

10. A supply device suitable for use in an illumination unit as claimed in claim 1, which supply device is provided with the high-frequency supply and with the ignition aids.

11. A supply device as claimed in claim 10, characterized in that the supply device is in addition provided with the coil.

* * * * *